(12) United States Patent
Bilenko et al.

(10) Patent No.: US 6,529,120 B1
(45) Date of Patent: Mar. 4, 2003

(54) SYSTEM FOR COMMUNICATING OVER A TRANSMISSION LINE

(75) Inventors: George Bilenko, Stamford, CT (US); Helena Zelmanovich, Deer Park, NY (US)

(73) Assignee: Intech 21, Inc., Glen Cove, NY (US)

( * ) Notice: Subject to any disclaimer, the term of this patent is extended or adjusted under 35 U.S.C. 154(b) by 0 days.

(21) Appl. No.: 09/276,000

(22) Filed: Mar. 25, 1999

(51) Int. Cl.[7] .............................................. H04M 11/04
(52) U.S. Cl. ............................ 340/310.06; 340/310.01; 340/310.07
(58) Field of Search ........................ 340/310.01, 310.06, 340/310.07, 310.05, 310.03; 307/104; 330/149; 343/850, 867; 455/280; 359/161

(56) References Cited

U.S. PATENT DOCUMENTS

| | | | | |
|---|---|---|---|---|
| 3,848,159 A | * | 11/1974 | Nye, Jr. et al. | |
| 3,895,370 A | * | 7/1975 | Valentini | 340/310.07 |
| 4,075,675 A | * | 2/1978 | Burkett et al. | 340/310.07 |
| 4,210,901 A | * | 7/1980 | Whyte et al. | |
| 4,745,391 A | * | 5/1988 | Gajjar | 340/310.07 |
| 4,903,006 A | * | 2/1990 | Boomgaard | 333/177 |
| 5,257,006 A | * | 10/1993 | Graham et al. | |
| 5,559,377 A | * | 9/1996 | Abraham | 340/310.07 |
| 5,892,758 A | * | 4/1999 | Argyroudis | 370/335 |

FOREIGN PATENT DOCUMENTS

DE 0156660 * 9/1982 ............ 340/310.07

* cited by examiner

*Primary Examiner*—Brent A. Swarthout
(74) *Attorney, Agent, or Firm*—Ira J. Schaefer; Clifford Chance (US) LLP

(57) ABSTRACT

A system for communicating over a transmission line has a plurality of transceivers, each for generating an information signal for transmission over the transmission line and for reception of an information signal transmitted thereto over the transmission line. A device couples each transceiver to the transmission line. The device includes a ferrite core surrounding the transmission line and at least one winding extending through the core and connected to the transceiver. As a result, the current signal corresponding to a generated information signal, as applied to the transmission line during transmission, and a current signal corresponding to a transmitted information signal is received From the transmission line during reception.

15 Claims, 1 Drawing Sheet

SYSTEM FOR COMMUNICATING OVER A TRANSMISSION LINE

BACKGROUND OF THE INVENTION

The present invention relates to a system for communicating over a transmission line, in particular, single phase and multi-phase power lines.

U.S. Pat. No. 5,723,848 describes a method and system for controlling heating cables, wherein information is transmitted between a main controller and remote terminals over power lines by spread spectrum data transmission.

It is desirable, when implementing a system such as that described in the aforementioned U.S. patent, to be able to make the connections to the power lines with the least amount of wiring and disruption to the power system.

SUMMARY OF THE INVENTION

The main object of the present invention is to provide new methods and devices for transmitting and/or receiving an information signal using a transmission line, such as a power line, by minimizing the wiring and disruption necessary to transmit a signal over the transmission line and receive a signal therefrom.

Another object of the present invention is to provide a system for communicating over a transmission line utilizing the methods and devices of the present invention.

In accordance with the present invention, a device is used for both applying a current signal corresponding to an information signal to a transmission line and for sensing a current signal corresponding to an information signal from a transmission line. The device comprises a ferrite core which surrounds the transmission line and has at least one winding extending through the core and connected to a transceiver. The permeability of the core and the number of turns of the winding extending through the core is based on the amount of noise in the system and the type of transmission line being used in the system. Moreover, for better termination of the transmitted signal, a capacitor can be connected in the vicinity of the core from the transmission line to ground. The value of the capacitance is also selected based upon the characteristics of the system.

In accordance with the invention, the ferrite core is a solid or split core and the transmission line is preferably one or more phases of a multi-phase feeder of 120 volts, 460 volts, 10 kilovolts, etc. The information signal applied to the winding and received from the winding of each core is preferably a spread spectrum transmission signal, but can be a narrow band signal with frequency shift keying (FSK), amplitude shift keying (ASK) or other transmission modulation scheme.

These and other objects and advantages of the present invention are achieved in accordance with the present invention as described hereinafter in more detail with regard to the attached drawings, wherein:

DETAILED DESCRIPTION OF THE INVENTION

Figure 1:
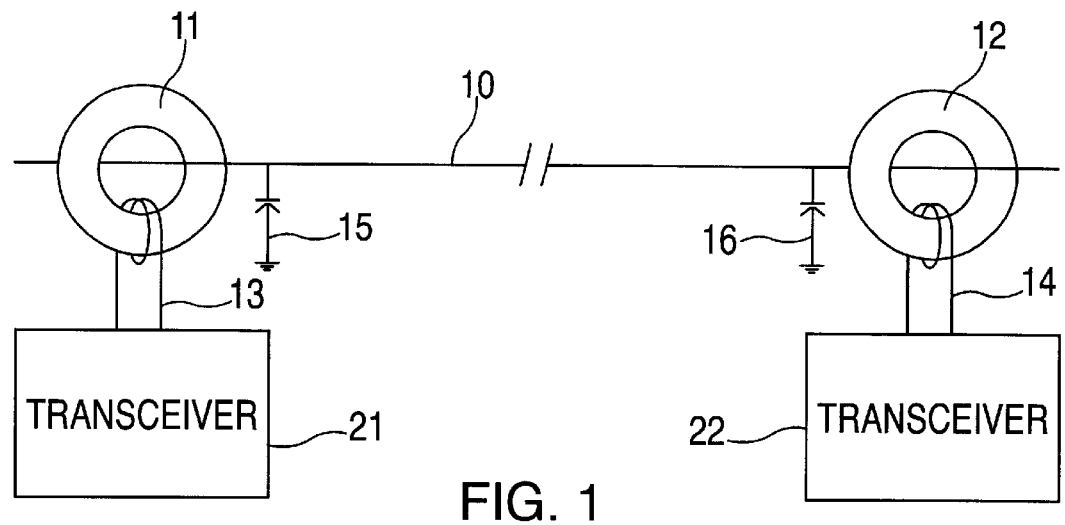
FIG. 1 is a schematic of one embodiment of the present invention.

Referring now to FIG. 1, a ferrite core 11 is disposed to surround one phase 10 of a multi-phase feeder which is preferably 120 volts, 460 volts, 10 kilovolts, etc. At a remote point, at least one other ferrite core 12 is disposed also surrounding the transmission line 10. A ferrite core is made by molding finely ground ferrite, which is a ceramic iron oxide possessing magnetic properties, into a toroidal form. The ferrite particles are then heat fused or sintered by applying heat and pressure. Ferrite cores have a diameter of from 0.05" to 1".

Each of the cores 11 and 12 have a winding 13, 14 extending through the core as shown, the number of turns or loops being from 1 to 12 and being selected based upon the characteristics of the system. The ferrite cores can be solid cores, when it is convenient to thread the transmission line through it, or preferably a split core so that it can be placed around a transmission line in situ and joined by an adhesive. The cores have a permeability of from 1000 to 2500 $\mu$(meters per ampere). The windings 13, 14 are connected to the input/output of transceivers 21, 22. Each of these transceivers can be a spread spectrum type transceiver, as is disclosed in U.S. Pat. No. 5,723,848, the disclosure of which is incorporated herein by reference. Other conventional transceivers for narrow band signals with ASK, FSK and other signal transmission modulation techniques can also be utilized.

Optionally, for better termination of the transmitted signal, capacitors 15 and 16 are connected from the transmission line 10 to ground in the vicinity of the cores 11 and 12 respectively. The capacitators preferably have a value of 10 to 100 picofarads and most preferably 20 picofarads.

For each other phase of a transmission line, one would use a set of circuit components as shown in FIG. 1.

Figure 2:
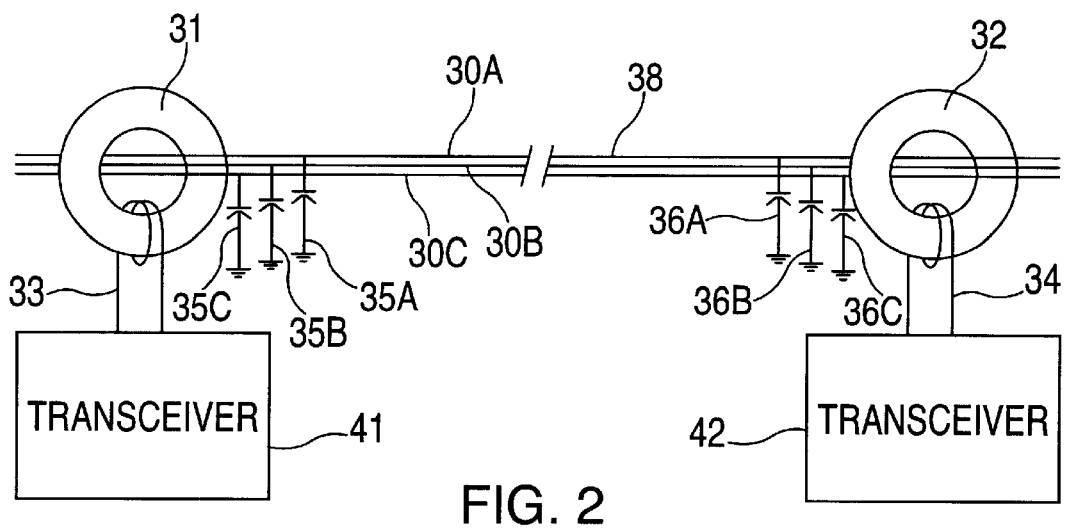
FIG. 2 is a schematic of another embodiment of the present invention.

In the alternative embodiment shown in FIG. 2, the multi-phase line 30 has all the phases 30A, 30B and 30C passing through cores 31 and 32 which are connected via windings 33 and 34 to transceivers 41 and 42. In this embodiment, the optional capacitors 35A, 35B and 35C, as well as capacitors 36A, 36B and 36C, are connected to ground as shown.

Although only two cores are shown in FIGS. 1 and 2, it is understood that a core would be used to couple each transceiver to the transmission line at different locations thereof to apply the information signal for transmission and sense the information signal for reception.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for transmitting an information signal on a transmission line, comprising the steps of: applying a current signal corresponding to an information signal to a transmission line comprising a multi-phase power line by surrounding the multi-phase power line with a ferrite core, applying the information signal to at least one winding extending through the core and applying a capacitor directly connected with no intervening elements from the transmission line to ground adjacent to each ferrite core used for communicating information signals with the transmission line, with no intervening connections to the transmission line between the ferrite core and the directly connected capacitor.

2. The method according to claim 1, wherein the information signal is a spread spectrum transmission signal.

3. The method according to claim 2, wherein the spread spectrum signal has a frequency range of 100 KHz to 400 KHz.

4. A method for receiving an information signal from a transmission line, comprising the steps of: sensing a current signal corresponding to an information signal from a transmission line comprising a multi-phase power line by surrounding the multi-phase power line with a ferrite core, sensing the information signal through at least one winding extending through the core and applying a capacitor directly connected with no intervening elements from the transmission line to ground adjacent to each ferrite core used for communicating information signals with the transmission line, with no intervening connections to the transmission line between the ferrite core and the directly connected capacitor.

5. The method according to claim 4, wherein the information signal is a spread spectrum transmission signal.

6. The method according to claim 5, wherein the spread spectrum signal has a frequency range of 100 KHz to 400 KHz.

7. A device for transmitting an information signal on a transmission line, comprising: a ferrite core for surrounding a transmission line comprising a multi-phase power line, at least one winding extending through the core for applying the information signal and a capacitor directly connected with no intervening elements from the transmission line to ground adjacent to each ferrite core used for communicating information signals with the transmission line, with no intervening connections to the transmission line between the ferrite core and the directly connected capacitor whereby a current signal corresponding to the information signal is applied to the transmission line.

8. The device according to claim 7, wherein the information signal is a spread spectrum transmission signal.

9. The device according to claim 8, wherein the spread spectrum signal has a frequency range of 100 KHz to 400 KHz.

10. A device for receiving an information signal from a transmission line, comprising: a ferrite core for surrounding a transmission line comprising a multi-phase power line, at least one winding extending through the core for sensing the information signal and a capacitor directly connected with no intervening elements from the transmission line to ground adjacent to each ferrite core used for communicating information signals with the transmission line, with no intervening connections to the transmission line between the ferrite core and the directly connected capacitor, whereby a current signal corresponding to the information signal is received from to the transmission line.

11. The device according to claim 10, wherein the information signal is a spread spectrum transmission signal.

12. The device according to claim 11, wherein the spread spectrum signal has a frequency range of 100 KHz to 400 KHz.

13. A system for communicating over a transmission line, comprising:

a transmission line comprising a multi-phase power line;

a plurality of transceivers, each for generating an information signal for transmission over the transmission line and for reception of an information signal transmitted thereto over the transmission line;

a device for coupling each transceiver to the transmission line comprising a ferrite core surrounding the multi-phase power line, at least one winding extending through the core and connected to the transceiver and a capacitor directly connected with no intervening elements from the transmission line to ground adjacent to each ferrite core used for communicating information signals with the transmission line, with no intervening connections to the transmission line between the ferrite core and the directly connected capacitor, whereby a current signal corresponding to a generated information signal is applied to the transmission line during transmission and a current signal corresponding to a transmitted information signal is received from the transmission line during reception.

14. The system according to claim 13, wherein the information signal is a spread spectrum transmission signal.

15. The device according to claim 14, wherein the spread spectrum signal has a frequency range of 100 KHz to 400 KHz.

* * * * *